J. M. NORRIS.
Automatic Stock-Watering Apparatus.
No. 149,147. Patented March 31, 1874.
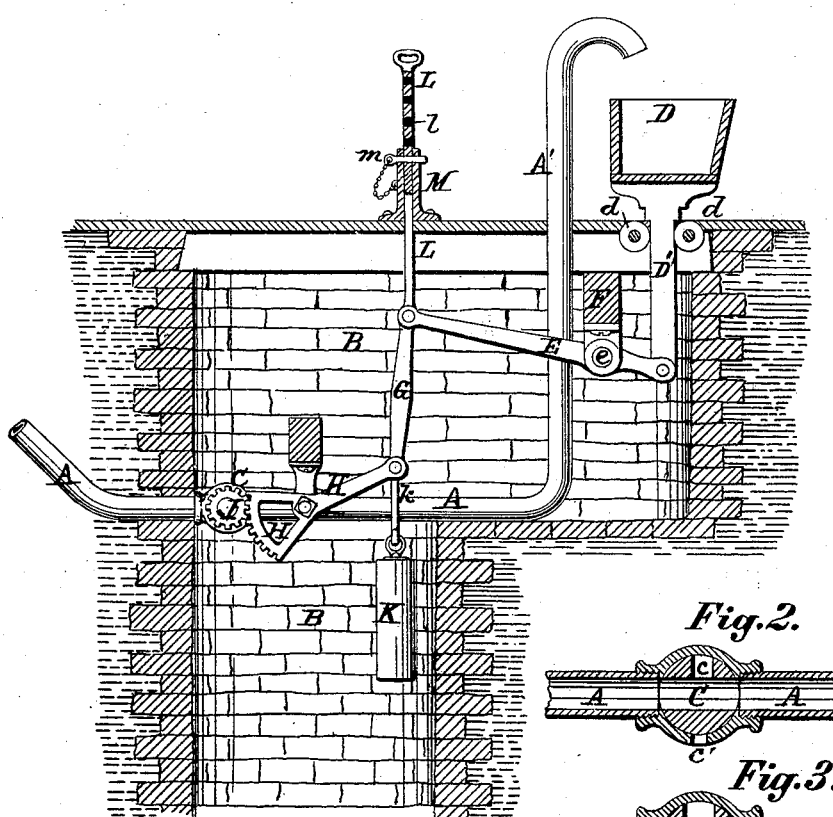
ATTEST:
Robert Burns.
H. G. Tanner
INVENTOR:
James M. Norris
By Knight Bro.
Attys.

UNITED STATES PATENT OFFICE.

JAMES M. NORRIS, OF SUE CITY, MISSOURI.

IMPROVEMENT IN AUTOMATIC STOCK-WATERING APPARATUS.

Specification forming part of Letters Patent No. 149,147, dated March 31, 1874; application filed February 24, 1874.

*To all whom it may concern:*

Be it known that I, JAMES M. NORRIS, of Sue City, Macon county, Missouri, have invented a certain Improved Automatic Stock-Watering Apparatus, of which the following is a specification:

This invention consists in the arrangement, in connection with the supply-pipe, which receives its supply from a raised pond, cistern, or well, of a drinking-trough, which, when full of water, descends and shuts off the supply of water through lever-connections with a suitable cock or valve in the supply-pipe; and when the trough is emptied by the stock it is caused to ascend, and turn on the supply of water by means of a weight attached to one of the operating-levers. The valve may be of any suitable construction, and is provided with a proper "waste," so as to drain the exposed parts of the supply-pipe when the supply is shut off. The valve is connected to a hand-rod, which passes up through a vertical standard, and is provided with a series of holes, through one of which passes a locking-pin that secures the rod in whatever position desired, and by which, in connection with the valve, the operator may permanently turn on, shut off, or graduate the supply of water to the trough. The whole of the operating parts, except the trough and spout, are arranged within a sealed well, which, in cold weather, supplies sufficient warmth to prevent freezing of the pipes, &c., and at all times receives the drip or waste from the spout-pipe.

Figure 1 is a sectional elevation. Figs. 2 and 3 are detail sections of the valve, showing it open and closed, respectively.

A is the supply-pipe, which extends to a raised pond, well, or cistern. B is a sealed well, in which are arranged the operating parts of the apparatus liable to be injured or closed by frost. C is a valve on the supply-pipe A, and which is provided with waste-ports $c\ c'$, to drain the part A' of the pipe A.

D is a drinking-trough, supported on a beam, D', which passes down between the friction-rollers $d\ d$ to connect with one end of the lever E, pivoted at $e$ to the cross-timber F. The other end of the lever E connects, by a link, G, with the pivoted sector-arm H, which gears with and turns the pinion I, keyed on the stem of the valve C; the purpose of the sector and pinion being to give an increased motion to the valve C, with a slight movement of the trough D, the sector-arm oscillating through, say, thirty degrees, and the pinion through ninety degrees. To the end of the sector-arm H is attached, by a link, $k$, the weight K. L is a hand-rod, connected to the outer end of the lever E, and, passing up through a standard, M, is provided with a seres of holes, $l$, through one of which passes a pin, $m$, to secure the rod L, and with it the valve C and its connecting mechanism, in any desired position, so that, by means of the rod and pin L $m$, the supply may be shut off, turned on, or regulated, as in summer time it may be necessary to have constant flow in small quantity, and in the coldest weather to shut off altogether, except at stated times.

By withdrawing the pin $m$, the apparatus becomes automatic, supplying the trough when empty, and closing the supply when it is full.

I claim as my invention—

1. The combination and arrangement of the supply-pipe A A', valve C, lever E, and weight K with the trough D, as and for the purpose set forth.

2. The combination and arrangement of the supply-pipe A, valve C, trough D, lever E, link G, sector-arm H, pinion I, weight K, rod L, and pin $m$ with the sealed well B, as and for the purpose set forth.

JAMES M. NORRIS.

Witnesses:
   B. F. STONE,
   WALTER BROWN.